United States Patent
Grimshaw

(10) Patent No.: US 9,294,724 B2
(45) Date of Patent: *Mar. 22, 2016

(54) METHOD OF OPERATING A COMMUNICATION SYSTEM

(71) Applicant: Intaglio, LLC, Grand Rapids, MI (US)

(72) Inventor: Kirk T. Grimshaw, Marne, MI (US)

(73) Assignee: Intaglio, LLC, Grand Rapids, MI (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/912,831

(22) Filed: Jun. 7, 2013

(65) Prior Publication Data

US 2013/0271558 A1    Oct. 17, 2013

Related U.S. Application Data

(63) Continuation of application No. 12/913,608, filed on Oct. 27, 2010, now Pat. No. 8,508,573.

(60) Provisional application No. 61/255,326, filed on Oct. 27, 2009.

(51) Int. Cl.

| H04N 7/15 | (2006.01) |
|---|---|
| H04M 3/56 | (2006.01) |
| H04N 7/14 | (2006.01) |
| H04M 1/725 | (2006.01) |

(52) U.S. Cl.
CPC .................. *H04N 7/15* (2013.01); *H04M 3/567* (2013.01); *H04N 7/142* (2013.01); *H04M 1/7253* (2013.01); *H04M 2250/62* (2013.01)

(58) Field of Classification Search
CPC ......... H04N 7/15; H04N 7/142; H04M 3/567; H04M 1/7253; H04M 2250/62
USPC ............................................ 348/14.01–14.16
See application file for complete search history.

(56) References Cited

U.S. PATENT DOCUMENTS

| 6,424,248 | B1 | 7/2002 | Toms et al. | |
|---|---|---|---|---|
| 8,265,240 | B2 | 9/2012 | Langgood et al. | |
| 2004/0000898 | A1 | 1/2004 | Pool et al. | |
| 2007/0171275 | A1 | 7/2007 | Kenoyer | |
| 2009/0096861 | A1* | 4/2009 | Saleh et al. | 348/14.08 |
| 2009/0253418 | A1 | 10/2009 | Makinen | |
| 2010/0118112 | A1* | 5/2010 | Nimri et al. | 348/14.08 |
| 2014/0253809 | A9* | 9/2014 | Epstein et al. | 348/705 |

* cited by examiner

*Primary Examiner* — Melur Ramakrishnaiah
(74) *Attorney, Agent, or Firm* — Reising Ethington, P.C.

(57) ABSTRACT

A communication system that may be integrated or otherwise combined with a piece of furniture, such as a conference table, desk or credenza. The communication system may provide a combination of audio, video, telephony, presentation and/or other conferencing functions and may include a number of separate user modules, a control module, a display module and a network connection. According to an exemplary embodiment, each of the separate user modules is a compact device that is integrated into the piece of furniture and includes a button that, when activated, allows a user to take control of certain aspects of the communication system. For example, a user may take over the display module or the information that is sent via the network connection by activating their user module.

18 Claims, 3 Drawing Sheets

METHOD OF OPERATING A COMMUNICATION SYSTEM

REFERENCE TO RELATED APPLICATIONS

This application is a continuation of copending U.S. application Ser. No. 12/913,608 filed Oct. 27, 2010 and claims the benefit of U.S. Provisional Application No. 61/255,326 filed on Oct. 27, 2009, the entire contents of which are incorporated herein by reference.

TECHNICAL FIELD

The present invention generally relates to a communication system and, more particularly, to a communication system that may provide a combination of audio, video, telephony, presentation and/or other conferencing functions and may be integrated into a piece of furniture such as a conference table.

BACKGROUND

Various types of communication systems have been used for tele-conferencing and video-conferencing purposes. Although such systems may provide users with certain communication features, they do not provide a communication system that is fully integrated into a piece of furniture, like a conference table or credenza.

SUMMARY

According to one aspect, there is provided a method of operating a communication system that can be integrated with a piece of furniture. The method may comprise the steps of: (a) receiving data from a first portable computing device at a display module, a network connection or both, wherein the data is received through a first user module; (b) receiving a status signal from a second user module indicating that the second user module has been activated by a user; and (c) in response to the activation of the second user module, stopping receiving data from the first portable computing device at the display module, the network connection or both, and starting receiving data from a second portable computing device at the display module, the network connection or both, wherein the data is received from the second portable computing device through the second user module.

According to another aspect, there is provided a method of operating a communication system that can be integrated with a piece of furniture. The method may comprise the steps of: (a) providing a communication system having a plurality of user modules, a control module, and a display module, each of the user modules can be connected to a separate portable computing device as well as the control module and each of the user modules has a button; (b) receiving a signal at the control module from a first user module indicating that a user has engaged a button on the first user module and, in response to receiving the signal, using the control module to display content on the display module from a portable computing device connected to the first user module; and (c) receiving another signal at the control module from a second user module indicating that a user has engaged a button on the second user module and, in response to receiving the another signal, using the control module to display content on the display module from a portable computing device connected to the second user module, wherein users can control the content displayed on the display module by engaging the buttons on the plurality of user modules.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
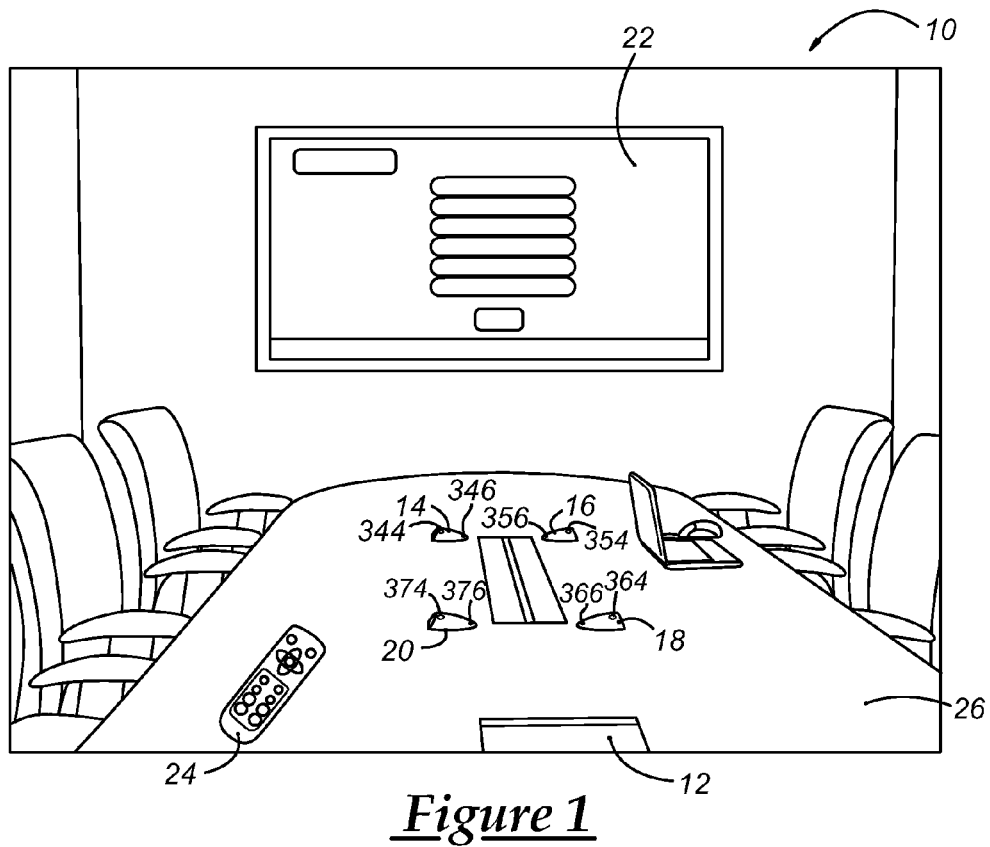
FIG. 1 is a photograph of an exemplary embodiment of a communication system that is integrated within a conference table.

With reference to FIG. 1, there is shown an exemplary communication system 10 that includes a number of hardware components integrated with a conference table, although they could be integrated in any number of other pieces of furniture instead. The exemplary system and method described below can provide a variety of functions including audio, video, telephony, presentation and/or other conferencing functions and features. According to one exemplary embodiment, communication system 10 reduces the complexity of the system by using a single standard media cable for certain connections, and includes a control module 12, user modules 14-20, a display module 22, and a remote control 24, and is incorporated in a piece of furniture 26. Each of these components is described below in conjunction with FIGS. 1-3.

Figure 2:
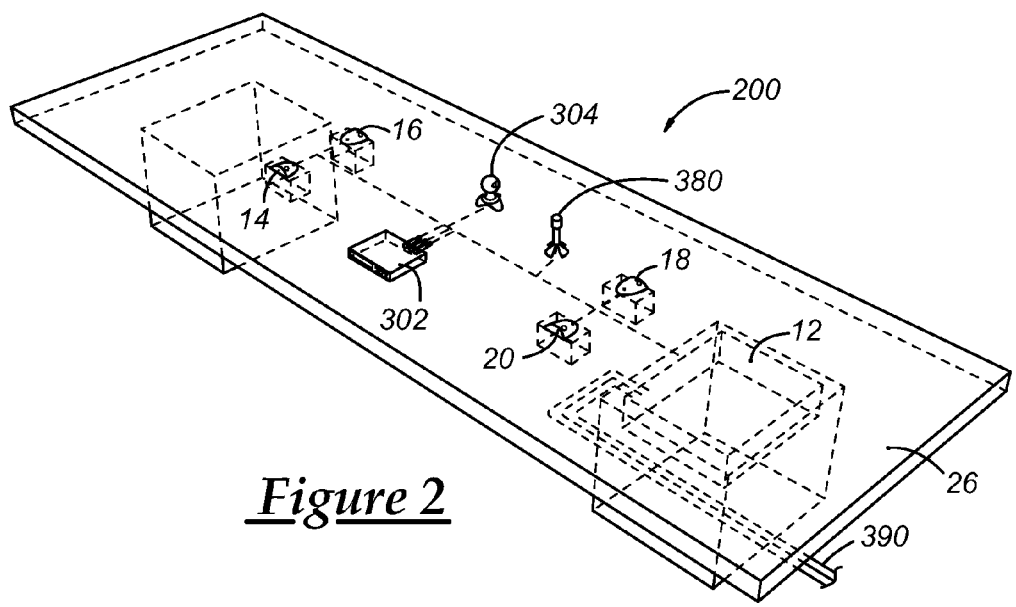
FIG. 2 is a general schematic diagram of the communication system illustrated in FIG. 1.

Control module 12 generally acts as an information hub for communication system 10 and exchanges information with the other hardware components in the system. Control module 12 may be mounted inside table 26, underneath the tabletop surface (as illustrated in FIG. 2), on top of the tabletop surface, or elsewhere. These are only some of the potential mounting locations and configurations, as the control module 12 may be mounted in a base, pedestal, cabinet, drawer, or other part of furniture 26 underneath the tabletop surface, to cite a few examples. Control module 12 may include any combination of electronic processing devices, memory devices, input/output (I/O) devices, and other hardware components, and may perform various control and communication related functions. In an exemplary embodiment, control module 12 includes several wire interfaces 310, audio processor 312, converters 314, 320, and 330, video processor 316, switch controller 318, controller 324, and network processor 322. In this exemplary embodiment, the wire interfaces 310 are designed to accommodate and connect cables having RJ-45 type jacks. However, this is only one possibility, as they could accommodate any other type of suitable cable or connection, including coaxial, fiber optic, twisted, ribbon, serial, parallel, etc.

Audio processor 312 processes audio signals from a variety of potential sources—including those that are internal and external to communication system 10—and routes the processed audio signals to appropriate destinations. According to one exemplary embodiment, audio processor 312 is a digital telephone hybrid processor that receives audio signals from a microphone 380 mounted in table 26, a network connection 390 and/or a communication accessory 302 (e.g., a DVD player), and sends processed audio signals to speakers 340-370 and/or to an outside network via network connection 390.

Of course, the preceding examples are only some of the possibilities as audio processor 312 may receive audio signals from any suitable source and may send processed audio signals to any suitable destination. For example, during a conference call audio signals are received from an outside network via network connection 390. The audio signals are provided to video processor 316 which, under the direction of controller 324, sends the audio content to audio processor 312 for processing. The processed audio signals are then provided to speakers 340, 350, 360, 370 which are located in user modules 14, 16, 18, 20, respectively. Skilled artisans will appreciate that audio processor 312 may directly receive audio signals from an audio source (such as the case with microphone 380) or they may indirectly receive audio signals through other components (such as the case with an outside caller, where audio signals are sent through network processor 322 and video processor 316 before they reach audio processor 312). The same is true for sending or outputting audio signals from the audio processor 312. Other arrangements and architectures are possible, as the exemplary arrangement of audio processor 312 is only one possibility.

Some potential features of audio processor 312 include: impedance matching, gain control, filtering, acoustic feedback reduction, and others that improve the audio quality of the system. Impedance matching (e.g., adaptive filtering) can minimize or eliminate echoes in the transmission path, which can exist in satellite, mobile phone, and VoIP connections, for example. Even though VoIP, ISDN and other similar technologies may not theoretically need a digital telephone hybrid processor, such as the exemplary one shown in FIG. 3, communication links that have VoIP or ISDN on one end may terminate in an analog line at the other end. Hence, there could be a significant source of echo, crosstalk, etc. which can be eliminated or minimized by audio processor 312. The preceding features are optional and may only be included on higher end models, as it is not necessary for the audio processor 312 to have all of these features.

Converters 314, 320, and 330 convert data from one form to another to be compatible with the various hardware components in communication system 10. In one example, converter 314 is a digital Cat-5 transcoder that receives a combination of audio/video signals from communication accessories 302 (e.g., a DVD player) through a Cat-5 connector, converts or adapts the audio/video signals for transmission over a different type of connection (e.g., HDMI), and then transmits the converted audio/video signals accordingly. Converter 314 may send the converted audio/video signals to a number of destinations, including switch controller 318. Converter 320 also converts data from one form to another and, according to one example, receives video or audio/video signals from video processor 316, converts these signals from HDMI to Cat-5, and then transmits the converted information to display module 22 over a Cat-5 connection having an RJ45 jack. The information may have to be converted back to an HDMI or similar format for subsequent provision to display module 22; converter 330 can perform this re-conversion. Stated differently, converter 320 may be an HDMI to Cat-5 converter and converter 330 may be a Cat-5 to HDMI converter. This is only one embodiment as other converter types may be used instead.

Video processor 316 processes audio, video and/or data signals from a variety of potential sources—including those that are internal and external to communication system 10—and routes the processed signals to appropriate destinations. According to one exemplary embodiment, video processor 316 is a video conference codec that receives audio, video and/or data signals from a camera 304, audio processor 312, switch controller 318 and/or network connection 390, and sends the processed signals to display module 22 via converters 320 and 330, audio processor 312 and/or an outside network via network connection 390. Of course, the preceding examples are only some of the possibilities as video processor 316 may receive signals from any suitable source and may send processed signals to any suitable destination. Video processor 316 may generally be used in both a receiving and a transmitting capacity.

For example, during a video-conference call where a combination of audio/video signals are received by control module 12 from an outside network via network connection 390 (receiving capacity), the combined audio/video signals are provided to video processor 316 which extracts the audio content and sends it to audio processor 312 and extracts the video content and sends it to converter 320 so that it may be presented on display module 22. Conversely, it is also possible for video processor to combine audio and video signals for suitable transmission over network connection 390 (transmitting capacity). In one example, video processor 316 combines audio signals gathered by microphone 380 and sent through audio processor 312 with video signals gathered by camera 304. The combined audio/video signals may be packaged and formatted according to one of a number of different techniques, and sent from video processor 316 for transmission over network connection 390. Depending on the particular embodiment, video processor 316 may include a device or a program that provides video codec, compress-decompress, code-decode, encryption-decryption, as well as other features and functions. It should be appreciated that video processor 316 is not limited to this exemplary embodiment, and may be include any number of different features, functions, characteristics, etc. not disclosed here.

Switch controller 318 receives audio, video and/or data signals from one or more user modules 14-20 and/or communication accessories 302 and, based on a user selection and arbitration method described below, provides the selected signals to an appropriate destination. For example, consider the case where separate laptop computers are connected to user modules 14-20 and are vying for control of the display module 22; that is, each of the connected computers is outputting data signals through data connections 342, 352, 362, 372 for presentation on display module 22. The display module 22 may not simultaneously display the information from all four computers/user modules. Thus, the users of modules 14, 16, 18, 20 can take control of the display module 22 by respectively engaging buttons 344, 354, 364, 374, which causes switch controller 318 to pass the data signals from the selected user module on to the display module. This process and feature is described below in more detail. Depending on the particular embodiment, switch controller 318 may be a hub, router, switch, bridge, multiplexor, or any other device where one or more input signals are received but a single input signal is selected according to a command signal. It is also possible for communication accessories 302, like a DVD player, to provide switch controller 318 with another input for selection.

Controller 324 communicates with most of the hardware devices of control module 12 and, according to one embodiment, controls aspects of their operation through a series of command signals. Controller 324 may include any combination of software and/or hardware components including electronic processing devices, memory devices, input/output (I/O) devices, etc. and may perform various control and/or communication related functions. In an exemplary embodiment, controller 324 receives information from and/or sends command signals to user modules 14-20 via wire interfaces 310, audio processor 312, video processor 316, converters 314 and 320, switch controller 318 and network processor 322 in order to control and direct the operation of communication system 10. Consider the example where separate laptop computers are connected to each of the user modules 14-20 (each user module has one or more data ports), but an operator has engaged button 344 on user module 14 because they wish to take control of display module 22. To explain, a user may engage or push a button 344, 354, 364, 374 on their user module in order to take control of display module 22 (e.g., display module 22 could show whatever is currently being displayed on the screen of the laptop computer connected to the selected user module). In the example above, controller 324 reviews the status of buttons 344, 354, 364, 374, determines that user module 14 has been selected, and sends command signals to switch controller 318, video processor 316 and/or converter 320 instructing them to pass the data signals from the selected user module 14 to display module 22. It is possible for controller 324 to review the status of each user module 14-20 or only those user modules that have a laptop computer or other device connected thereto, to cite a few possibilities. Controller 324 is not limited to this example, as it may gather information, make decisions, and issue command signals for a variety of other tasks as well.

Figure 3:
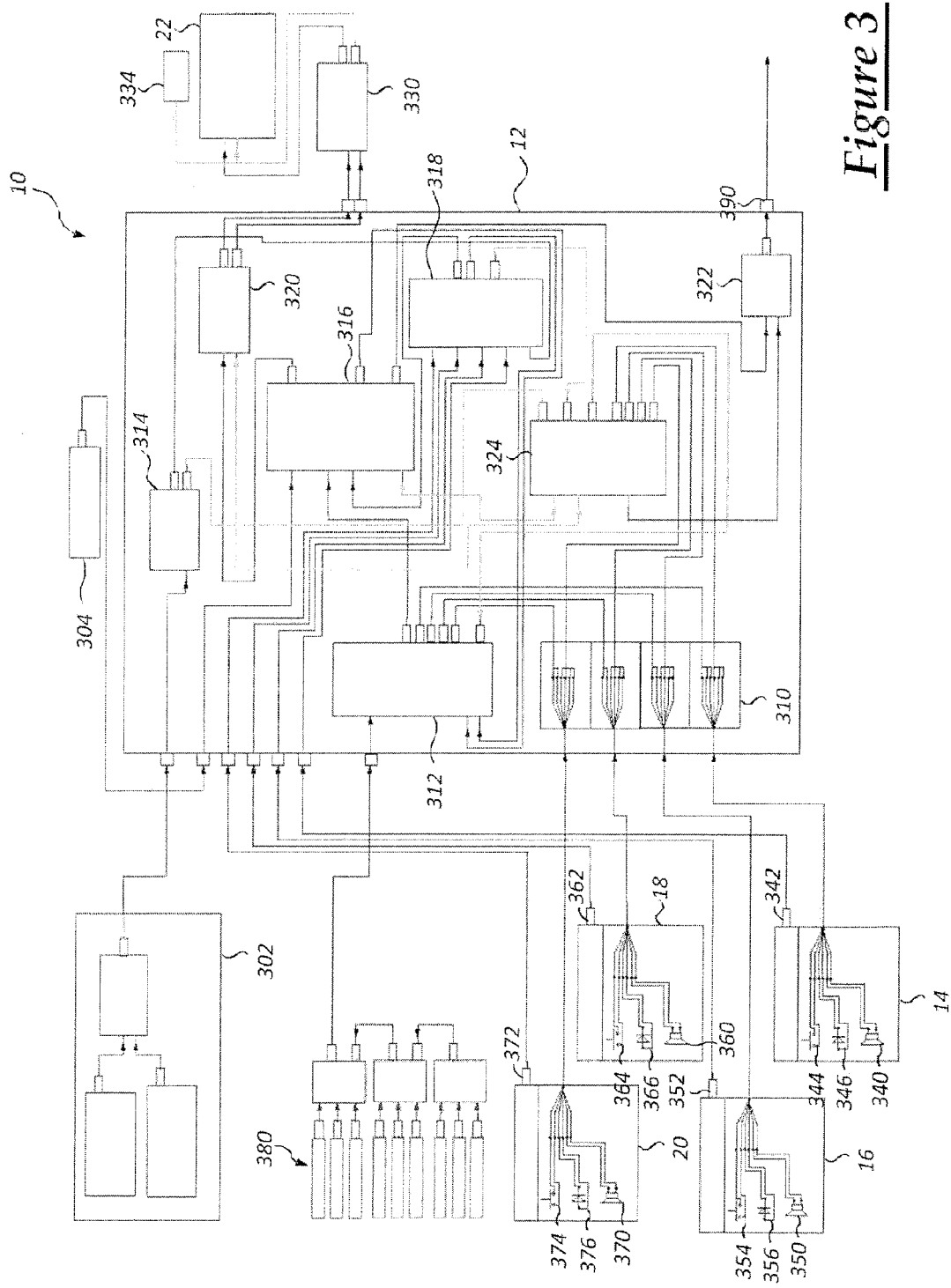
FIG. 3 is a more detailed schematic diagram of the communication system illustrated in FIG. 1.

Network processor 322 generally acts as an interface between control module 12 and an outside network. In an exemplary embodiment, network processor 322 is an Ethernet switch which connects communication system 10 to an outside network, such as an IP network like the Internet or a public switched telephone network (PSTN). It should be appreciated by skilled artisans that network processor 322 can include any combination of hardware components and may provide a variety of functionality, including acting as a hub, switch, router, bridge, repeater and/or any other suitable device. Furthermore, even though FIG. 3 shows an exemplary embodiment of a wired network processor 322, that device may be a wired or wireless component. Skilled artisans will recognize that while FIGS. 2 and 3 show the various wired connections with a single line (dashed or solid), this is only provided for purposes of illustration and that the connections may be of any suitable type known in the art.

Each of the preceding devices, components, modules, etc. may be provided in a number of different forms. For instance, each of the individual components of control module 12 may be provided in the form of an integrated circuit (IC), an application specific integrated circuit (ASICs), or some other type of circuit or hardware device, and may be connected to one another via a printed circuit board (PCB) or other suitable means. If two or more components of control module 12 are "connected" together, it is not necessary that they be directly connected or coupled together, as they could be indirectly connected together through one or more intervening components or devices. Control module 12 may come with a protective housing or cover that maintains all of the components in a single protected environment, protects them from outside contaminants or electromagnetic interference (EMI), and can be easily mounted or attached to a piece of furniture 26 like a conference table.

User modules 14-20 provide a user the ability to interface with communication system 10 and, as best seen in FIGS. 1 and 2, may be integrated into conference table 26 or some other piece of furniture. As mentioned above, communication system 10 may provide the user with an opportunity to connect a device (e.g., laptop computer, netbook, PDA, mobile phone, etc.) to one or more of the user modules 14-20. In addition, the user modules 14-20 may provide the user with an opportunity to visually and/or verbally communicate with a remote person via a speaker, a microphone, a webcam, etc.

Even though FIGS. 1 and 2 only show four user modules, communication system 10 may provide fewer or more user modules than this. For instance, a small version of communication system 10 may provide only one or two user modules while a larger version of the communication system may provide four to ten user modules.

Furthermore, user modules 14-20 may utilize local and/or global system components. For instance, the user modules 14-20 may have individual input and/or output accessories (e.g., one speaker per user module, one microphone per user module, one camera per user module, etc.). In another embodiment, communication system 10 may provide global accessories, for example, one camera 304 for the entire communication system. These are only a few examples as others will become evident to a person skilled in the art. User modules 14-20 may include any combination of hardware and/or software components needed for connecting a user to communication system 10 for audio, video and/or data communication. In the exemplary embodiment shown in FIG. 3, user modules 14-20 respectively include speakers 340-370, data connections 342-372, data ports (not shown), buttons 344-374, and indicators 346-376.

Speakers 340, 350, 360, 370 are mounted in user modules 14, 16, 18, 20, respectively, and convert audio signals into sound so that the users may hear audio output from communications system 10. Speakers 340-370, sometimes called loudspeakers, may include a combination of acoustic transducers (e.g., drivers) and an enclosure housing one or more transducers. Speakers 340-370 may include any suitable speaker including a subwoofer, woofer, mid-range, tweeter, supertweeter, etc. or a combination speaker (e.g., n-way speaker). In addition, speakers 340-370 can be piezoelectric, magnetic, electrostatic, ribbon, bending wave, distributed mode, Heil air motion, plasma arc, digital, or any other suitable type of speaker. Audio signals from a telephone conference call, a video conference call, a DVD player, a computer presentation, or any other suitable source may be converted to sound and transmitted to the users via speakers 340-370.

Data connections 342, 352, 362, 372 enable user modules 14, 16, 18, 20, respectively, to exchange data signals and otherwise communicate with communication system 10. The data connections 342-372 may include any combination of power connections, computer display connections, network connections, etc. These connections can include any combination of wireless and/or wired connections including RJ-45, USB, AC plug, BNC, TNC, VGA, RCA, etc. In one embodiment, each user module includes a data port (not shown) and an electrical outlet which enable a user to connect their laptop computer or other device to communications system 10 via the user module. Power can be provided to the laptop computer, while data is exchanged between the laptop computer and the use module via the data port. This and other information may then be exchanged between the user module and the communication system 10 via data connections 342-372. In some instances, the user module may simply pass the data from the laptop computer to the communication system without processing it, in other instances the user module may perform some type of signal processing on the information so that it is more suitable for transmission to the communication system. These are only some of the embodiments as others are possible. For example, the data port between the laptop computer and the user module and/or the data connection between the user module and the communication system may be a wireless port.

Buttons 344, 354, 364, 374 provide a user with the ability to take over certain aspects of communication system 10 by giving the corresponding user module control over devices like the display module 22, etc. To illustrate, if a user presses or otherwise engages button 344 on user module 14, then communications system 10 (more specifically, controller 324 and switch controller 318) gives control of display module 22 to user module 14. Thus, if the user has a laptop computer plugged into a data port on user module 14, the video and/or data signals from that computer are sent to display module 22 so that all meeting attendees can see what is on that particular computer. Likewise, audio, video and/or data signals may be sent to an outside network via network connection 390, so that remote meeting attendees may follow along as well. If, following the activation of button 344, a different user were to press button 354 on user module 16 then control would pass to that user module instead.

Different button engagement combinations could be used for different tasks. For example, pushing a button 344, 354, 364, 374 on a user module when communication system 10 is 'off', could turn the system 'on'; pushing and holding a button on a user module when communication system 10 is already 'on', could disable a specific user module and/or the entire communication system by turning it 'off'; pushing a button twice could give that user module certain privileges but not all privileges, and so on. Buttons 344-374 may be contact or contactless buttons, switches, a touch screen, or any actuator that provides a change of state. The button can be activated with momentary, time delay, toggle, or any other action. In addition, the list of potential buttons that can be used includes toggle switch, pushbutton, touch switch, sense switch, biometric switch, fingerprint switch, etc., as this feature is not limited to any specific electro-mechanical device and is meant to broadly encompass any type of button, switch or other user-activated control that allows the user to activate one of the user modules.

Indicators 346, 356, 366, 376 are mounted on user modules 14, 16, 18, 20, respectively, and indicate the status or state of buttons 344-374. Indicators 346-376 can be part of or integrated into buttons 344-374 (e.g., illuminated buttons) or they can be separate indicators (e.g., LED, lamp, etc.) housed in user modules 14-20. Indicators 346-376 can include audio (e.g., beep sound), visual (e.g., LED), or any combination of indicators. In one embodiment, indicators 346-376 indicate or signal which user module currently has control of communications system 10 and is providing information to display module 22, etc.

Display module 22 acts as a visual and/or audio output for communication system 10, and may be provided according to one of a number of different embodiments. Display module 22 can be a single standalone device, such as that shown in FIG. 1, or it may be integrated within user modules 14-20. According to an exemplary embodiment, display module 22 is a television, projector and/or monitor, but it may be any other suitable display device instead.

Remote control 24 can remotely operate a variety of functions of the communications system 10, including system setup, audio, video, telephony, presentation, and conferencing functions. It includes several buttons which provide menu and option navigation. In an exemplary embodiment, remote control 24 comprises power, menu, up, down, left, right, enter, mute, home, volume up, volume down, yellow, green, red, and blue buttons, which can be used for easy navigation of the various menus used by the graphical user interface (GUI).

Conference table 26 is a piece of furniture that is designed to accommodate one or more components or pieces of communications system 10. FIG. 1 shows an exemplary embodiment of table 26 where the control module 12 is mounted underneath the top surface of the table (e.g., with access through an access panel), and user modules 14-20 are mounted within the top surface such that an operator has access to them. However, table 26 can take a different shape or form (e.g., round, oval, modular, rectangular, square, corner, etc.) and it may include different components for accommodating parts of communication system 10 (e.g., pedestal, multiple legs, suspension cables, brackets, etc.). Even though table 26 is referred to as a conference table, skilled artisans will appreciate that it can be a variety of different furniture articles including an executive desk, a sideboard, a credenza, etc.

Continuing with the exemplary embodiment shown in FIG. 3, there is also shown a microphone 380, communication accessories 302, and a camera 304. Microphone 380 can be any transducer or sensor that converts sound into an electrical audio signal that is fed to communication system 10. It can be housed in user modules 14-20 or it can include one or more separate entities mounted at different locations around a communication area (e.g., conference room, meeting room) or stands on a horizontal surface (e.g., table, desk, etc.). Microphone 380 can be any of a list of microphones including condenser, capacitor, electrostatic, dynamic, carbon, piezoelectric, fiber optic, laser, MEMS, or any other microphone. Accessories 302 can include any accessories used in an audio/video communication setting. In one embodiment, accessories 302 include a DVD player and a computer which provide the communication system 10 with audio, video and/or data signals. Other accessories include headphones, laptop docking stations, wireless signal boosters, antennas, etc. Accessories 302 can be part of user modules 14-20 instead. Camera 304 is a video capturing device that feeds video signals to communication system 10. It can be a wired or wireless device transmitting via an Ethernet or Wi-Fi network. Camera 304 may be part of user modules 14-20, integrated with microphone 380, or a central unit in a communication setting to list but a few examples. In an exemplary embodiment shown in FIG. 3, camera 304 is a high-definition (HD) video conferencing PTZ camera.

Figure 4:
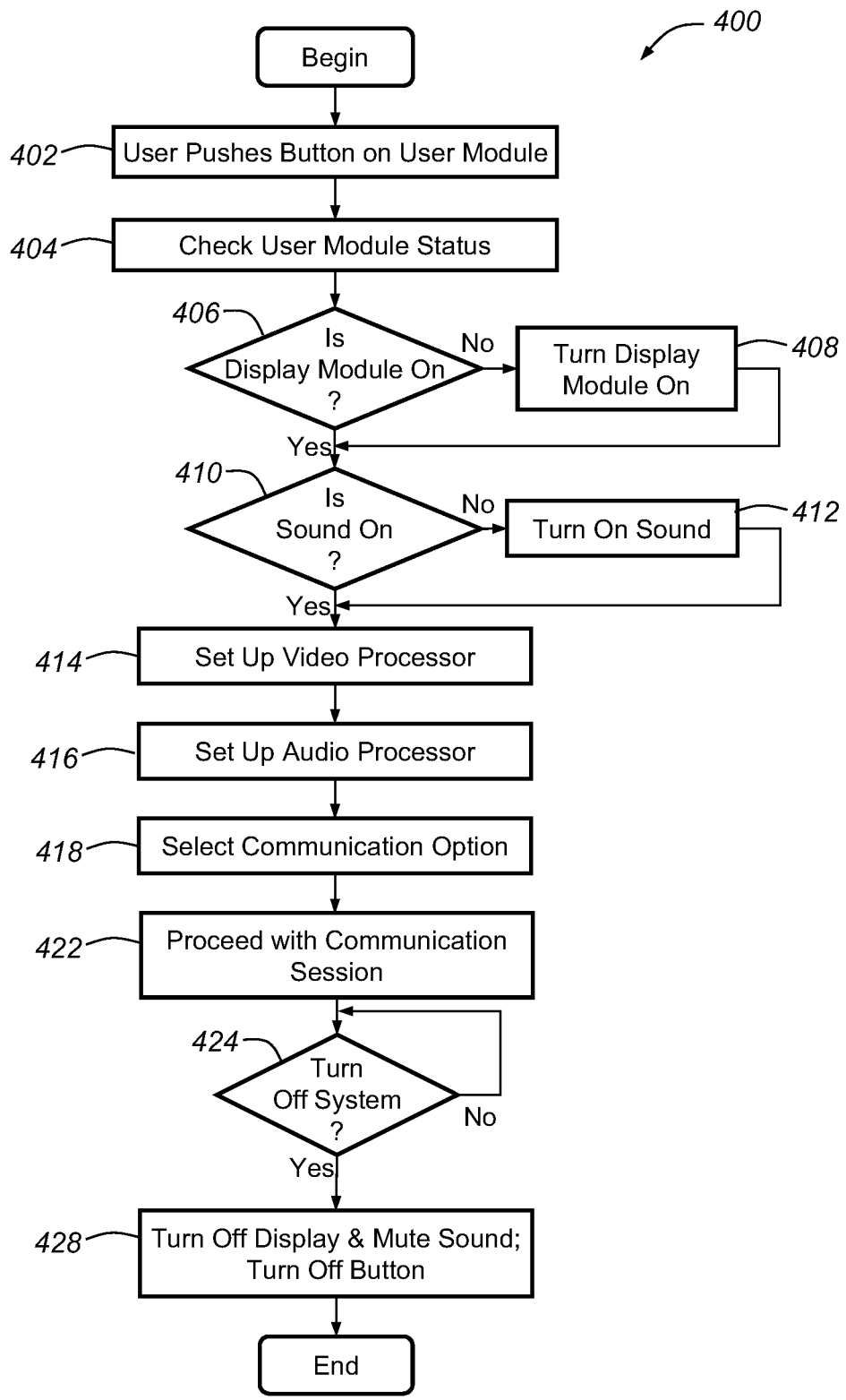
FIG. 4 is a flowchart of an exemplary method that may be used with the communication system illustrated in FIG. 1.

Turning now to FIG. 4, there is shown an exemplary method 400 that may be used to operate or control communication system 10. Assuming that the communication system 10 starts out being turned 'off', the method begins at step 402 when a user pushes a button 344, 354, 364, 374 on one of the user modules. This action may initiate any combination of different events. In one embodiment, when a user pushes a button 344-374, a corresponding indicator 346-376 turns 'on' and a request signal is sent from that user module to controller 324 to begin system setup. If another button 344-374 is subsequently pushed, the new user module will be selected and given control. Of course, any number of other techniques may be used to turn the communication system 10 on.

Step 404 checks the status of the initiating user module; that is, the user module that includes the button that turned the communication system on. Once the initiating user module is identified, communication system 10 queries or otherwise checks to see which, if any, external devices are connected to that user module. In one embodiment, controller 324 receives status signals via data connections 342, 352, 362, 372 and switch controller 318 or it receives them directly from the user module in question, and uses these status signals to detect the presence of any externally connected devices like a laptop computer. External devices may be connected to a user module via a USB, RJ, VGA and/or other connection, and more than one external device may be connected to a single user module. Controller 324 may have a priority hierarchy that it follows when multiple external devices are connected to a single user module. For example, if a laptop computer is connected to a USB port on user module 14 and a PDA is connected to a different serial port on the same user module, then controller may process the signals from the USB port first. This would be a priority hierarchy based on the different ports or port-based priority, where one port has priority over another; other non-port-based priority arrangements are also possible. If the signals from the USB port are dropped (e.g., the laptop computer is turned 'off' or disconnected) then may be the PDA connected to the serial port could be the next priority. This is, of course, only one exemplary embodiment as others can be used instead.

Step 406 determines if the display module 22 is 'on'. In an exemplary embodiment, controller 324 receives a status signal from display module 22 via converter 320 and/or video processor 316 and, if the display module is 'off', sends a command signal to turn the display module 22 'on' (step 408). Similarly, steps 410 and 412 determine if the speakers 340, 350, 360, 370 or other audio devices are 'on' and, if they are 'off', step 412 generates a command signal for turning them 'on'. In one embodiment, controller 324 receives one or more status signals from speakers 340-370 via audio processor 312 or directly from the user modules, and then makes a status decision based on the status signals.

Step 414 initializes, configures, activates or otherwise prepares the control module 12 to receive and process audio, video and/or data signals from video processor 316. As appreciated by those skilled in the art, video processor 316 may need to perform some handshaking or other start-up procedures before processing information; in this regard, the video processor may need to communicate with one or more of the other hardware components of the control module 12, including controller 324. Similarly, step 416 initializes, configures, activates or otherwise prepares the control module 12 to receive and process audio, video and/or data signals from audio processor 312.

Next, a user selects one or more communication options, step 418. As previously explained, communication system 10 provides a variety of different options for communicating, including external communication with one or more outside parties (e.g., telephone conferencing, video conferencing, web conferencing, etc.), internal communication with the different persons seated around the conference table 26 (e.g., conference room only, the sharing of presentations, etc.), secure and non-secure communications, and so on. In an exemplary embodiment, step 418 allows a user to select one or more communication options via remote control 24, where the options are displayed in menus presented on display module 22. If a user selects an internal communication option, for example, then outside lines via network connection 390 could be disabled. If a user does not select a video conferencing option, for instance, then camera 304 may be disabled as it is not needed for this particular meeting. Any initialization or set up steps needed to implement the user's selections may be performed at this time. Again, any combination of options and settings could be selected by the user and implemented by communication system 10.

Once the preceding steps are performed, a communication session using communication system 10 can proceed, step 422. Any number of the audio, video and/or data communication options described above may be utilized during a communication session, depending on how it is set up, the constituency of the users, etc. In one embodiment, phone numbers, web addresses and other contact information are stored in control module 12 so that a speed dial or memory dial feature may be used to call a certain person. Audio processor 312 or some other device within control module 12 may be equipped with voice-recognition software such that it can operate the communication system 10 according to spoken commands given by the users. A communication session can be processed via network processor 322 or via a phone line. If at any point during the communication session, a user engages a button on a different user module—that is, a different user module than the one that currently has control—then, controller 324 makes the necessary changes in the setup to give the newly selected user module control of the display module 22, the network processor 322, the speakers 340-370, etc. In some instances, it is even possible for more than one user module have control at the same time. A first user module may have control of the display module 22, while another user module is providing information to an external participant via network connection 390, for example.

In one embodiment, communication system 10 combines data from a first portable computing device—like a laptop or notebook computer or a smart phone—with data from video camera 304, and provides the combined data to display module 22 and/or network connection 390. Display module 22 may be presented with the combined data in a 'split-screen' type of fashion where the same content that is currently on the portable computing device is shown on one half of the screen and the video content is shown on the other half of the screen. The same combined data may also be provided to network connection 390 so that a remote user can receive and view the same split-screen display. In the case of display module 22 and/or network connection 390, audio content can also be provided from microphone 380. If a separate user module breaks in or is otherwise activated while this split-screen display is being presented, then the screen half that is displaying the data from the first portable computing device (i.e., the non-video screen half) can switch or otherwise transition to the second portable computing device that is connected to the second user module. The screen half that is displaying the video data may remain unchanged; this is particular true if a single shared video camera 304 is used by communication system 10.

The communication session may carry on until one or more of the participants decide to terminate the session. Step 424 inquires if the system should be turned 'off'. One way for a user to deactivate or turn 'off' the system is to push and hold one of the buttons 344-374. The button can be held for a fixed time (e.g., five seconds) or for an adjustable amount of time that is established through a configuration menu during setting up, for example. Engagement of a button 344-374 to turn 'off' communication system 10 could trigger one or more events in step 428.

In step 428, one or more functions or devices are shutdown or put into a standby state. In one embodiment of step 428, a shutdown command signal is generated by controller 324 and is sent to one or more of the other hardware devices of communication system 10, such as accessories 302, display module 22, audio processor 312, video processor 314, switch controller 318, network processor 322, camera 304 and/or microphone 380. It should be appreciated that the preceding descriptions of communication system 10 and method 400 are merely exemplary and that the present invention is not limited to these specific embodiments. For instance, the exact combination, sequence and/or order of the exemplary steps in method 400 is only one possibility, as many others are possible as well.

It is to be understood that the foregoing description is not a definition of the invention, but is a description of one or more preferred exemplary embodiments of the invention. The invention is not limited to the particular embodiment(s) disclosed herein, but rather is defined solely by the claims.

Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the claims.

As used in this specification and claims, the terms "for example," "e.g.," "for instance," "like" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a communication system that can be integrated with a piece of furniture, comprising the steps of:
   (a) receiving data from a first portable computing device at a display module, a network connection or both, wherein the data is received through a first user module;
   (b) receiving a status signal at a controller or a switch controller from a second user module indicating that the second user module has been activated by a user; and
   (c) in response to the activation of the second user module, stopping receiving data from the first portable computing device at the display module, the network connection or both, and starting receiving data from a second portable computing device at the display module, the network connection or both, wherein the data is received at the display module from the second portable computing device through the second user module when the controller or the switch controller determines that an internal communication option is desired, and the data is received at the network connection from the second portable computing device through the second user module when the controller or the switch controller determines that an external communication option is desired.

2. The method of claim 1, wherein step (a) further comprises receiving data from the first portable computing device at the display module so that the display module displays the same content as is currently displayed on the first portable computing device, and step (c) further comprises stopping receiving data from the first portable computing device at the display module, and starting receiving data from the second portable computing device at the display module so that the display module displays the same content as is currently displayed on the second portable computing device.

3. The method of claim 1, wherein step (a) further comprises receiving data from the first portable computing device at the network connection so that a remote user will see the same content as is currently displayed on the first portable computing device, and step (c) further comprises stopping receiving data from the first portable computing device at the network connection, and starting receiving data from the second portable computing device at the network connection so that the remote user will see the same content as is currently displayed on the second portable computing device.

4. The method of claim 1, wherein step (a) further comprises receiving data from the first portable computing device and a video camera at the display module so that the display module simultaneously shows the same content as is currently displayed on the first portable computing device and the video content in a split-screen fashion.

5. The method of claim 1, wherein step (a) further comprises receiving data from a first portable computing device and a video camera at the network connection so that a remote user can simultaneously see the same content as is currently on the first portable computing device and the video content in a split-screen fashion.

6. A method of operating a communication system that can be integrated with a piece of furniture, comprising the steps of:
   (a) providing a communication system having a plurality of user modules, a control module, and a display module, each of the user modules can be connected to a separate portable computing device as well as the control module and each of the user modules has a button;
   (b) receiving a signal at the control module from a first user module indicating that a user has engaged a button on the first user module and, in response to receiving the signal, using the control module to display content on the display module from a portable computing device connected to the first user module; and
   (c) receiving another signal at the control module from a second user module indicating that a user has engaged a button on the second user module and, in response to receiving the another signal, using the control module to display content on the display module from a portable computing device connected to the second user module, wherein users can control the content displayed on the display module by engaging the buttons on the plurality of user modules, and wherein at least one of step (b) or step (c) further comprises detecting a plurality of portable computing devices connected to a single user module when a user has engaged the button on the same user module, and using a priority hierarchy to determine which portable computing device will provide content to the display module.

7. The method of claim 6, wherein at least one of step (b) or step (c) further comprises receiving a signal at the control module from a user module indicating a certain button engagement combination, and different button engagement combinations involving the user module button result in different actions by the communication system.

8. The method of claim 7, wherein a button engagement combination including a push and hold of one of the user module buttons causes the communication system to power off.

9. The method of claim 6, wherein at least one of step (b) or step (c) further comprises activating an indicator on a user module when a user has engaged a button on the same user module, and the activated indicator visually identifies which user module currently has control of the content on the display module.

10. The method of claim 6, further comprising the step of: receiving a communication option selection from a user that causes the content displayed on the display module to also be provided to a network connection for external communication with one or more outside parties.

11. The method of claim 6, further comprising the step of: receiving a communication option selection from a user that causes content from the first user module to be displayed on the display module and content from the second user module to be provided to the network connection for external communication with one or more outside parties.

12. The method of claim 6, further comprising the step of:
receiving a communication option selection from a user that causes the display module to simultaneously show content from a portable computing device connected to a user module and content from a video camera in a split-screen fashion.

13. The method of claim 6, further comprising the step of:
receiving a communication option selection from a user that causes the display module to simultaneously show content from a portable computing device connected to a first user module and content from another portable computing device connected to a second user module in a split-screen fashion.

14. The method of claim 6, further comprising the step of:
receiving video or data signals from one or more outside parties via a network connection and using the control module to provide the video or data signals to the display module so that local users at the communication system can view corresponding video or data content.

15. The method of claim 6, further comprising the step of:
receiving audio signals from one or more outside parties via a network connection and using the control module to provide the audio signals to a speaker so that local users at the communication system can hear corresponding audio content.

16. The method of claim 6, wherein the plurality of user modules and the control module are integrated into a conference table.

17. The method of claim 6, wherein each of the plurality of user modules includes a data port for connection to a portable computing device, an electrical outlet, a data connection for connection to the control module, and at least one of a speaker, a microphone or a camera integrated within the user module.

18. The method of claim 6, wherein the communications system provides telephone conferencing, video conferencing and web conferencing functions to local users as well as remote users.

* * * * *